(12) United States Patent
Kauth et al.

(10) Patent No.: US 9,771,451 B2
(45) Date of Patent: Sep. 26, 2017

(54) METHOD FOR PRODUCING POLYCARBONATE ACCORDING TO THE PHASE INTERFACE METHOD

(71) Applicant: Covestro Deutschland AG, Leverkusen (DE)

(72) Inventors: Hermann Kauth, Krefeld (DE); Stephan Laue, Houston, TX (US); Jan Heijl, Lokeren (BE); Rolf Bachmann, Bergisch Gladbach (DE); Franky Bruynseels, Sint Gillis-Waas (BE); Maarten De Bock, Kalmthout (BE); Johan Vanden Eynde, Zwijnaarde (BE); Somchai Kanjanasantisak, Rayoung (TH)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/109,237

(22) PCT Filed: Jan. 21, 2015

(86) PCT No.: PCT/EP2015/051077
§ 371 (c)(1),
(2) Date: Jun. 30, 2016

(87) PCT Pub. No.: WO2015/110447
PCT Pub. Date: Jul. 30, 2015

(65) Prior Publication Data
US 2016/0326315 A1    Nov. 10, 2016

(30) Foreign Application Priority Data

Jan. 24, 2014 (EP) .................... 14152441

(51) Int. Cl.
C08G 64/00 (2006.01)
C08G 64/24 (2006.01)
C08G 64/14 (2006.01)
C08G 63/02 (2006.01)

(52) U.S. Cl.
CPC ............. C08G 64/24 (2013.01); C08G 64/14 (2013.01)

(58) Field of Classification Search
CPC .................................................... C08G 64/24
USPC ................................................ 528/196, 198
See application file for complete search history.

(56) References Cited

U.S. PATENT DOCUMENTS 2,964,794 A   12/1960  Peilstöcker et al.
2,991,273 A    7/1961  Hechelhammer et al.
2,999,835 A    9/1961  Goldberg
2,999,846 A    9/1961  Schnell et al.
3,148,172 A    9/1964  Fox
3,271,367 A    9/1966  Schnell et al.
3,879,348 A    4/1975  Serini et al.
3,986,269 A   10/1976  Hancock
4,122,112 A   10/1978  Koda et al.
4,318,773 A    3/1982  Ullrich et al.
4,423,207 A   12/1983  Flock et al.
4,627,949 A   12/1986  Dhein et al.
4,631,338 A   12/1986  Meyer et al.
4,980,105 A   12/1990  Schmidt et al.
4,982,014 A    1/1991  Freitag et al.
5,126,428 A    6/1992  Freitag et al.
5,235,026 A    8/1993  Wulff et al.
5,306,803 A    4/1994  Arlt et al.
6,776,925 B2   8/2004  Hofmann et al.
7,847,051 B2  12/2010  Ebert et al.
7,863,403 B2   1/2011  Heuer et al.
2004/0249105 A1  12/2004  Nolte et al.
2012/0015763 A1   1/2012  Isogawa et al.

FOREIGN PATENT DOCUMENTS

| | | |
|---|---|---|
| BE | 866 991 A1 | 11/1978 |
| DE | 1 137 167 B | 9/1962 |
| DE | 1570703 A1 | 2/1970 |
| DE | 2036052 A1 | 1/1972 |
| DE | 20 53 876 A1 | 5/1972 |
| DE | 2 063 050 A1 | 7/1972 |
| DE | 2211956 A1 | 10/1973 |
| DE | 2 725 967 A1 | 12/1977 |
| DE | 2 701 173 A1 | 7/1978 |
| DE | 33 32 065 A1 | 3/1985 |
| DE | 3 429 060 A1 | 2/1986 |
| DE | 3832396 A1 | 2/1990 |
| DE | 102008008841 A1 | 8/2009 |
| EP | 0 039 96 A1 | 9/1979 |
| EP | 0089801 A1 | 9/1983 |
| EP | 0 256 003 A1 | 2/1988 |
| EP | 0 267 025 A1 | 5/1988 |
| EP | 0269324 A2 | 6/1988 |
| EP | 304 691 A2 | 3/1989 |
| EP | 0 411 510 A2 | 2/1991 |
| EP | 0 460 450 A2 | 12/1991 |
| EP | 520 272 A2 | 12/1992 |
| EP | 0517044 A2 | 12/1992 |
| EP | 0634445 A1 | 1/1995 |
| EP | 1 368 407 A1 | 12/2003 |

(Continued)

OTHER PUBLICATIONS

International Search Report for PCT/EP2015/051077 dated Apr. 10, 2015.

*Primary Examiner* — Terressa Boykin
(74) *Attorney, Agent, or Firm* — Drinker Biddle & Reath LLP (57) ABSTRACT

The invention relates to an efficient continuous method for producing polycarbonates according to the phase interface method.

15 Claims, 1 Drawing Sheet

(56) References Cited

FOREIGN PATENT DOCUMENTS

| | | |
|---|---|---|
| EP | 1 599 520 A1 | 11/2005 |
| EP | 2090605 A1 | 8/2009 |
| EP | 2098553 A1 | 9/2009 |
| FR | 1561518 A | 3/1969 |
| GB | 905072 A | 9/1962 |
| GB | 1122003 A | 7/1968 |
| GB | 1229482 A | 4/1971 |
| GB | 1364310 A | 8/1974 |
| GB | 1367790 A | 9/1974 |
| GB | 1592724 A | 7/1981 |
| WO | WO-8704637 A1 | 8/1987 |
| WO | WO-02068503 A1 | 9/2002 |
| WO | WO-2004076515 A1 | 9/2004 |

METHOD FOR PRODUCING POLYCARBONATE ACCORDING TO THE PHASE INTERFACE METHOD

CROSS-REFERENCE TO RELATED APPLICATIONS

This application is a national stage application (under 35 U.S.C. §371) of PCT/EP2015/051077, filed Jan. 21, 2015, which claims benefit of European Application No. 14152441.3, filed Jan. 24, 2014, both applications of which are incorporated herein by reference in their entirety.

The present invention relates to an efficient continuous process for the preparation of polycarbonate by the phase boundary process.

BACKGROUND OF THE INVENTION

The polycarbonate preparation by the phase boundary process has already been described by Schnell, "Chemistry and Physics of Polycarbonates", Polymer Reviews, Volume 9, Interscience Publishers, New York, London, Sydney 1964, pages 33-70; D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 18, (1980)"; pages 75-90, D. Freitag, U. Grigo, P. R. Müller, N. Nouvertne', BAYER AG, "Polycarbonates" in Encyclopedia of Polymer Science and Engineering, Volume 1 1, Second Edition, 1988, pages 651-692, and finally by Dres. U. Grigo, K. Kircher and P. R-Müller, "Polycarbonate [Polycarbonates]" in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Banner Verlag Munich, Vienna 1992, pages 118-145.

Furthermore, the phase boundary process for the preparation of polycarbonate is also described in EP-A 0 517 044 or EP-A 520 272.

For the preparation of polycarbonate by the phase boundary process, the phosgenation of a disodium salt of a bisphenol or a mixture of different bisphenols, initially introduced into aqueous alkaline solution or suspension, is effected in the presence of an inert organic solvent or solvent mixture which forms a second organic phase in addition to the aqueous phase. The resulting oligocarbonates mainly present in the organic phase are condensed with the aid of suitable catalysts to give high molecular weight polycarbonates dissolved in the organic phase, it being possible to control the molecular weight by suitable chain terminators (monofunctional phenols). The organic phase is finally separated off and the polycarbonate is isolated therefrom by various working-up steps.

Continuous processes for the preparation of condensates using phosgene—for example the preparation of aromatic polycarbonates or polyester carbonates or their oligomers—by the two-phase boundary process have as a rule the disadvantage that, for accelerating the reaction and/or improving the phase separation, more phosgene has to be used than is required for the product balance. The excess phosgene is then degraded in the synthesis in the form of byproducts—for example additional sodium-chloride or alkalicarbonate compounds. Typically, the phosgene excess of about 20 mol % based on the added diphenolate, is used for the continuous two-phase boundary process for the preparation of aromatic polycarbonates (cf. D. Freitag, U. Grigo, P. R. Müller, N. Nouvertne, BAYER AG, "Polycarbonates" in Encyclopedia of Polymer Science and Engineering, Volume 1, 1, Second Edition, 1998, pages 651-692).

In a reduction of the excess phosgene, undesired secondary effects occur, such as poor separation of the dispersion after the last reaction step, and hence increased water content in the organic solution or increased residual monomer or chain terminator contents in the waste water. Various methods for reducing the excess phosgene are discussed in the literature.

DE-A 2 725 967 discloses the teaching that it is advantageous for the phosgene yield of a process first to combine aqueous and organic phase, which contains phosgene, in a tube and then to introduce said phases into a reactor of the tank type. The residence time in this tube should be between 0.5 and 15 seconds. The phosgene excess of the reaction is more than 10 mol %. This reduced phosgene excess requires a disadvantageous phase ratio of organic phase (i.e. oil) to water in order to achieve an effective separation of the two phases after the end of the reaction. Another disadvantage is the relatively long residence time for the phosgenation.

According to a continuous phase boundary process for the preparation of polycarbonates disclosed in EP-A-304 691, an aqueous phase comprising diphenols and just the amount of alkalihydroxide required is combined with a phosgene-containing organic phase in a tube with the use of a static mixer. The phosgene excess of 20 to 100 mol % is very high and the residence time in the reaction tube for the first reaction step is 10 to 75 s. With this process, only prepolymers having a molecular weight of 4000 to 12 000 g/mol can be prepared.

EP 0 517 044 A2 describes the reduction of the phosgene excess by means of an annular hole nozzle and a flow tube, just sufficient sodium hydroxide solution being used so that BPA still remains dissolved. This process requires complicated regulation with measurement of the chlorocarbonic acid ester groups by means of an ATR crystal and regulated subsequent metering of sodium hydroxide solution to prevent overacidification of the reaction solution. Furthermore, this reaction requires a phase ratio of oil to water that forms a water-in-oil dispersion (oil/water phase ratio greater than 1). The residence time in the flow tube is at least several seconds.

EP 0 520 272 B1 discloses that a small phosgene excess can be achieved by splitting the stream of the BPA solution. Here, part of the BPA solution is mixed with the phosgene solution via a nozzle so that, in this step, a phosgene excess of at least 20 mol % is used. The mixture then reacts further in a flow tube with a minimum residence time of 3 s. Here too, it is required that the dispersion be a water-in-oil dispersion. The disadvantage of the process consists, inter alia, also in the greater effort for metering a second BPA stream.

EP 2 098 553 discloses a continuous process for the production of polycarbonate by the phase boundary process in which a disperser is used for the mixing of the organic phase and the aqueous phase, and the mixture is then reacted in a reactor with a residence time of less than 0.5 s. With respect to the avoidance of side reactions and the reduction of the phosgene excess, however, this process also requires improvement.

DETAILED DESCRIPTION OF THE INVENTION

It was accordingly the object of the present invention to provide such a process in which a phosgene excess reduced as far as possible can be employed, an efficient subsequent separation of the two phases is permitted and side reactions are avoided.

Surprisingly, it was found that, in a continuous process for the preparation of polycarbonate by means of phase boundary processes, a particular combination of reaction parameters is very important for the avoidance of side reactions of all types:

It is known that the reaction mixture has to be cooled to a temperature of 45° C. or below in order to achieve very substantial avoidance of side reactions with the catalyst. Surprisingly, it has now been found that an elevated temperature in the reaction system prior to addition of the catalyst can have minimal effects on the formation of byproducts. Accordingly, the cooling can be delayed until shortly before addition of the catalyst, and the first reaction steps can be carried out at higher temperatures.

Alongside this, the pH of the system has to be controlled very precisely over the course of the reaction. Free OH ions present during the phosgenation step lead to side reactions, for example the saponification of phosgene to give carbonate salt. It has now been found that a very precise mixture of from 2.00 to 2.05 mol of sodium hydroxide solution per mole of bisphenol is most effective in avoiding the formation of the carbonate salt. During the phase in which residues of free phosgene can be present, therefore, no further addition of alkali solution is permitted. It has been found that in order to achieve complete consumption of the phosgene in the reaction the reaction mixture should be introduced into a pumped-circulation reactor with a ratio of pumped-circulation rate to total through-flow rate of from 5 to 15. It has moreover been found that during the incorporation of the chain terminator the phase equilibrium of the phenolic components is optimal when the pH has been set between 11.3 and 11.8. If phenol is used as chain terminator, the phenol should be added in the form of an organic solution with a concentration of from 5 to 40% by weight, in order that phenol is not extracted into the aqueous phase and fails to react. When p-tert-butylphenol is used as chain terminator, for optimal reaction this should be added in the form of an organic solution with a concentration of from 2 to 25% by weight.

The present invention therefore relates to a process for the continuous preparation of polycarbonates with weight-average molecular weight $M_w$ of 15 000-200 000 g/mol by the phase boundary process from at least one dihydroxydiarylalkane, phosgene and at least one catalyst, optionally in the presence of at least one chain terminator and/or branching agent, where
  (a) a mixture of an organic and of an aqueous phase is produced by continuously dispersing the organic phase in the aqueous phase or the aqueous phase in the organic phase in a disperser, the organic phase containing at least one solvent suitable for the polycarbonate and at least some of the phosgene and the aqueous phase containing the dihydroxydiarylalkane(s), water and from 2.00 to 2.05 mol of alkali solution per mole of dihydroxydiarylalkane(s),
  (b) the mixture is then reacted in a reactor with a residence time of less than 0.5 s,
  (c) the reaction mixture is then redispersed and reacted further, optionally with addition of further chain terminator(s) in a pumped-circulation reactor with a recirculation rate of 5 to 15 times the amount of flour, and
  (d) alkali solution and chain terminator is added and further condensation is effected in the presence of at least one catalyst in at least one further reactor,
where in step (d) the reaction temperature is at most 45° C. and the aqueous phase is set to a pH between 11.3 and 11.8;
and where no alkali solution is added in steps (b) and (c).

It is preferable that in step (d) alkali solution and preferably chain terminator is/are added in a first reactor and catalyst is added in a second reactor.

During the dispersing of the organic phase in the aqueous phase or of the aqueous phase in the organic phase by means of a disperser, an oil-in-water or a water-in-oil dispersion may be produced, oil being understood as the organic phase. Preferably, an oil-in-water dispersion is produced during the dispersing. Preferably, the organic phase is dispersed continuously in the aqueous phase by means of the disperser.

By definition, an oil-in-water dispersion is one in which water forms the external (continuous) phase and oil forms the internal (dispersed) phase, i.e. oil droplets are distributed in water. A water-in-oil dispersion is consequently one in which oil forms the external phase and water the internal phase.

The organic phase may already contain some or all of the required phosgene before the dispersing with the aqueous phase. Preferably, the organic phase already contains the total amount of required phosgene, including the phosgene excess used, before the dispersing.

The introduction of the phosgene into the organic phase can be effected in gaseous or liquid form. The excess of phosgene used, based on the sum of the dihydroxydiarylalkanes used, is preferably at most 13 mol %, particularly preferably at most 11 mol %, very particularly preferably at most 10 mol %, and in particular between 5 and 10 mol %.

During the phosgenation step (a) it is preferable that as little free alkali solution as possible is made available, in order to avoid saponification of the phosgene to give sodium carbonate (i.e. a loss of phosgene). According to the invention, therefore, in step (a) and 2.00 to 2.05 mol of alkali solution are used per mole of dihydroxydiarylalkane, and in the steps (b) and (c) no alkali solution is added. In step (d), the setting of the pH is important in order to achieve optimal setting of the equilibrium, determined for the purposes of this invention, of the phenolic components. According to the invention, therefore, the subsequent metered addition of alkali solution and the addition of chain terminator take place in step (d), it being preferable here that chain terminator is added first, followed by alkali solution.

Figure 1:
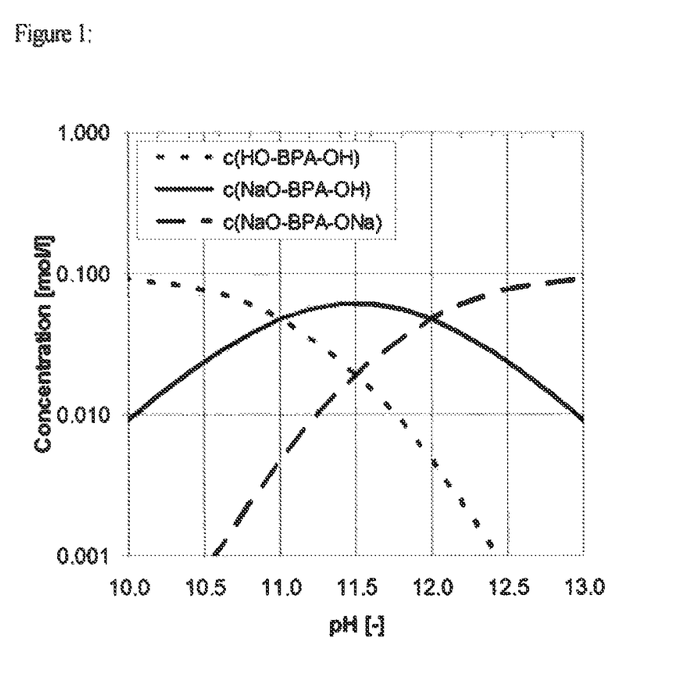
FIG. 1 is a graph representation of the equilibrium between bisphenol A and its deprotonated variants resulting in a phase distribution.
Figure 2:
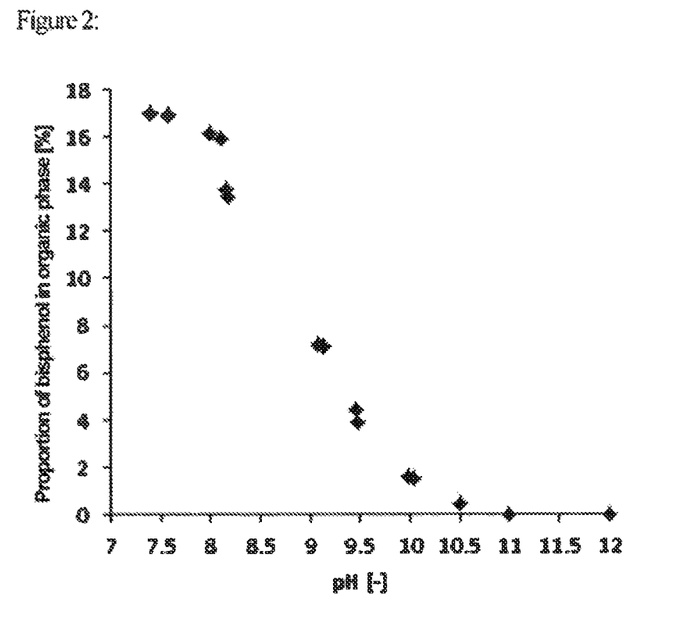
FIG. 2 is a phase distribution as a function of the pH for bisphenol A.

FIG. 1 shows by way of example the equilibrium between bisphenol A and its deprotonated variants. These acid-base equilibria result in a phase distribution, the location of the ionic components being preferably the aqueous phase, and that of the uncharged components being preferably in the organic phase. FIG. 2 shows the phase distribution as a function of the pH for the example of bisphenol A; (the stated concentrations are in each case based on the values measured in the organic phase).

The phosgene metering is effected before the mixing with the aqueous phase, completely or partly directly into the organic phase. Any portions of phosgene can also be metered into the aqueous phase before the dispersing or into the dispersion after the dispersing. Furthermore, can the phosgene either completely or partly be metered into a recycled part-stream of the synthesis mixture of both phases, this part-stream preferably being recycled before the addition of catalysts. In another embodiment, the described aqueous phase is mixed with the phosgene-containing organic phase and then added to the abovementioned recycled part-stream after a residence time of less than 5 seconds, or the two phases, the described aqueous phase with the phosgene-containing organic phase are mixed directly into the abovementioned recycled part-stream. Particularly preferably, the complete phosgene metering is effected before the mixing with the aqueous phase, directly into the organic phase. In all these embodiments, the pH ranges described above should be maintained, if appropriate by metering of further sodium hydroxide solution once or several times or correspondingly metering further bisphenolate solution. Likewise, the temperature range must be maintained, if appropriate by cooling or dilution.

The organic phase may consist of one solvent or mixtures of a plurality of solvents. Suitable solvents are aromatic and/or aliphatic chlorinated hydrocarbons, preferably dichloromethane, trichloroethylene, 1,1,1-trichloroethane, 1,1,2-trichloroethane and chlorobenzene and mixtures thereof. However, it is also possible to use aromatic hydrocarbons, such as benzene, toluene, m-/p-/o-xylene, or aromatic ethers, such as anisole, alone, as a mixture or additionally or as a mixture with chlorinated hydrocarbons; dichloromethane and chlorobenzene and mixtures thereof are preferred. Another embodiment of the synthesis uses solvents which do not dissolve but only partly swell polycarbonate. It is therefore also possible to use nonsolvents for polycarbonate in combination with solvents. In this case, it is also possible to use, as solvents, solvents soluble in the aqueous phase, such as tetrahydrofuran, 1,3- or 1,4-dioxane or 1,3-dioxolane, if the solvent partner forms the second organic phase.

Suitable dihydroxydiarylalkanes—hereinabove and hereinbelow also referred to inter alia as diphenol—are those of the general formula in which Z is a divalent organic radical having 6 to 30 carbon atoms, which contains one or more aromatic groups. Examples of such compounds which can be used in the process according to the invention are dihydroxydiarylalkanes, such as hydroquinon, resorcinol, dihydroxybiphenyl, bis(hydroxyphenyl)alkanes, bis(hydroxyphenyl)cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl)sulphoxides, α,α'-bis(hydroxyphenyl)diisopropylbenzenes, and compounds thereof which are alkylated, alkylated on the nucleus and halogenated on the nucleus.

Preferred dihydroxydiarylalkanes are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl) propane (bisphenol A (BPA)), 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone 2,4-bis(3,5-dimethyl-4-hydroxyphenyl)-2-methylbutane 1,3-bis[2-(3,5-dimethyl-4-hydroxyphenyl)-2-propyl]benzene, 1,1-bis(4-hydroxyphenyl)cyclo-hexyne and 1,1-bis(4-hydroxyphenyl)-3,3,5-trimethylcyclohexane (bisphenol TMC).

Particularly preferred dihydroxydiarylalkanes are 4,4'-dihydroxybiphenyl, 1,1-bis(4-hydroxyphenyl)phenylethane, 2,2-bis(4-hydroxyphenyl)propane (bisphenol A (BPA)), 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and further suitable dihydroxydiarylalkanes are described, for example, in U.S. Pat. No. 2,999,835, U.S. Pat. No. 3,148,172, U.S. Pat. No. 2,991,273, U.S. Pat. No. 3,271,367, U.S. Pat. No. 4,982,014 and U.S. Pat. No. 2,999,846, in the German laid-open patent applications DE-A 1 570 703, DE-A 2 063 050, DE-A 2 036 052, DE-A 2 211 956 and DE-A 3 832 396, the French patent FR-A 1 561 518, in the monograph by H. Schnell, Chemistry and Physics of Polycarbonates, Interscience Publishers, New York 1964, page 28 et seq.; page 102 et seq., and by D. C. Legrand, J. T. Bendler, Handbook of Polycarbonate Science and Technology, Marcel Dekker New York 2000, page 72 et seq.

According to the invention, polycarbonates is understood to mean both homopolycarbonates and copolycarbonates. In the case of the preparation according to the invention of homopolycarbonates, only one dihydroxydiarylalkane is used; in the case of the preparation according to the invention of copolycarbonates, a plurality of dihydroxydiarylalkanes is used, it of course being possible for the dihydroxydiarylalkanes used, as well as all other chemicals and auxiliaries added to the synthesis, to be contaminated with the impurities originating from their own synthesis, handling and storage, although it is desirable to work with raw materials which are as pure as possible.

In the context of the invention, alkali solution is preferably to be understood as meaning sodium hydroxide solution, potassium hydroxide solution or mixtures of these, particularly preferably sodium hydroxide solution.

The aqueous phase in the phase boundary process for the preparation of the polycarbonate contains alkali solution, one or more dihydroxydiarylalkanes and water, it being possible for the concentration of this aqueous solution, based on the sum of the dihydroxydiarylalkanes, calculated not as alkali metal salt but as free dihydroxydiarylalkane, to vary preferably between 1 and 30% by weight, particularly preferably between 3 and 25% by weight, very particularly preferably from 15 to 18% by weight based on the total weight of the aqueous phase. The organic phase in the phase boundary process for the preparation of the polycarbonate preferably contains 12 to 22% by weight of polycarbonates with an $M_w$ of greater than 45 000, based on the total weight of the organic phase, and preferably 12 to 40% by weight, particularly preferably 15 to 30% by weight of polycarbonates with an $M_w$ of 45 000 or less, based on the total weight of the organic phase. In the case of higher concentrations, it may be necessary to thermostate the solutions. The alkali hydroxide used for dissolving the dihydroxydiarylalkanes, e.g. sodium hydroxide or potassium hydroxide, may be used in solid form or as a corresponding aqueous alkali solution. The concentration of the alkali solution depends on the target concentration of the dihydroxydiarylalkane solution strived for but as a rule it is between 5 and 25% by weight, preferably 5 and 10% by weight, based on 100% strength alkali solution, or is chosen to be more concentrated and then diluted with water. In the process with subsequent dilution, alkali solutions having concentrations between 15 and 75% by weight, preferably 25 and 55% by weight, optionally thermostated, are used. The alkali metal content per mole of dihydroxydiarylalkane is dependent on the structure of the dihydroxydiarylalkane but as a rule is from 1.5 mol of alkali/mole of dihydroxydiarylalkane to 2.5 mol of alkali/mol of dihydroxydiarylalkane, preferably from 1.8 to 2.2 mol of alkali/mole of dihydroxydiarylalkane and, in the particularly preferred case where bisphenol A is used as the sole dihydroxydiarylalkane, from 1.85 to 2.15 mol of alkali, very particularly preferably 2.00 mol of alkali. If more than one dihydroxydiarylalkane is used, these may be dissolved together. Since the solubility of dihydroxydiarylalkanes is very greatly dependent on the amount of alkali used, it may however be advantageous to have not one solution comprising two dihydroxydiarylalkanes but preferably two solutions having one dihydroxydiarylalkane each dissolved in a suitable alkali solution, which are then metered separately so that the correct mixing ratio results. Furthermore, it may be advantageous to dissolve the dihydroxydiarylalkane(s) not in alkali solution but in dilute dihydroxydiarylalkane solution provided with additional alkali. The dissolution processes may start from solid dihydroxydiarylalkane or generally in scale or prill form, or from molten diphenol. In the case of sodium hydroxide or sodium hydroxide solution, the alkali metal hydroxide used or the alkali solution, respectively, may have been prepared, for example, by the amalgam process or the so-called membrane process. Both processes have long been used and are familiar to the person skilled in the art, in the case of sodium hydroxide solution, that prepared by the membrane process is preferably used.

In such an aqueous solution and/or the aqueous phase, the dihydroxydiarylalkane(s) is or are present completely or partly in the faint of the corresponding alkali metal salts or dialkali metal salts.

An optionally practised metering of dihydroxydiarylalkane(s) after or during the phosgene introduction can be carried out for as long as phosgene or its direct derivatives, the chlorocarboxylic esters are present in the reaction.

Suitable catalysts for the process according to the invention are preferably tertiary amines, such as, for example, triethylamine, tributylamine, trioctylamine, N-methylpiperidine, N-methylpiperidine or N-iso/n-propylpiperidine, quaternary ammonium salts, such as, for example, tetrabutylammonium, tributylbenzylammonium, or tetraethylammonium hydroxide, chloride, bromide, hydrogen sulphate or tetrafluoroborate, and the phosphonium compounds corresponding to the abovementioned ammonium compounds. These compounds are described in the literature as typical phase boundary catalysts, are commercially available and are familiar to the person skilled in the art. The catalysts can be added to the synthesis individually, as a mixture or side by side and in succession, optionally also before the phosgenation, but meterings after the phosgene introduction are preferred, unless an onium compound—i.e. ammonium or phosphonium compound—or mixtures of onium compounds are used as catalysts. In the case of such an onium salt catalysis, an addition before the phosgene metering is preferred. The metering of the catalyst or of the catalysts can be effected as such, in an inert solvent, preferably a solvent or one of the solvents of the organic phase in the polycarbonate synthesis, or as aqueous solution. In the case of the use of tertiary amines as a catalyst, for example, the metering thereof can be effected in aqueous solution as the ammonium salts thereof with acids, preferably mineral acids, in particular hydrochloric acids. With the use of a plurality of catalysts or the metering of portions of the total amount of catalyst, it is of course also possible to carry out different metering procedures at different places and at different times. The total amount of the catalyst used is preferably between 0.001 and 10 mol %, preferably 0.01 to 8 mol %, particularly preferably 0.05 to 5 mol %, based on moles of dihydroxydiarylalkanes used.

It has been found that the catalyst effect and the side reactions with the catalyst are temperature dependent. The temperature during the catalyst addition (step (d)) is therefore at most 45° C., preferably from 35 to 45° C., particularly preferably from 35 to 40° C. This temperature can be achieved by means of cooling. For this, the reaction mixture can be cooled at the start of the reaction and/or prior to the catalyst addition. It is preferable that the solution is cooled at least prior to the catalyst addition, for example immediately prior thereto. In order to avoid side reactions, it is preferable to use from 0.8 to 1.6 mol % of catalyst (based on the dihydroxyalkane). According to the invention the catalyst addition takes place in step (d); it is preferable that no catalyst is previously present in the reaction mixture.

For regulating the molecular weight, the addition of one or more monofunctional chain terminator(s), such as phenol or alkylphenols, in particular phenol, p-tert-butylphenol, isooctylphenol, cumylphenol, the chlorocarbonic acid esters thereof or acid chlorides of monocarboxylic acids or mixtures of these chain terminators may optionally be required. Such chain terminators are optionally either fed to the reaction with dihydroxydiarylalkane(s) or added to the synthesis at any desired time during the synthesis as long as phosgene or chlorocarbonic acid terminal groups are still present in the reaction mixture, in the case of the acid chlorides and chlorocarbonic acid esters as chain terminators, as long as sufficient phenolic terminal groups of the resulting polymer are available. Preferably, however, the chain terminator or terminators are added after the phosgenation at a place or at a time where or when phosgene is no longer present but the catalyst has not yet been metered in, i.e. they can be metered in before the catalyst, together with the catalyst or parallel thereto. The chain terminator(s) can be added as melt, in an aqueous alkaline solution, or in a solution in the organic solvent used for the reaction. Preference is given to the solution of the chain terminator(s) in the organic solvent used; the chain terminator(s) is/are thus brought into the organic phase, into the vicinity of the reactive acyl chloride end groups. It is particularly preferable that the metered addition of the chain terminator takes place in step (d) before addition of the catalyst.

In one particularly preferred embodiment of the process according to the invention, phenol is used as chain terminator. It is preferable that the phenol is used in step (d) in the form of a solution comprising at least one organic solvent and the phenol in a concentration of from 5 to 40% by weight, preferably from 10 to 25% by weight. In this embodiment, it is preferable that at the end of the reaction (i.e. in step (d)) the aqueous phase is set to a pH of from 11.3 to 11.6. It is preferable that the addition of the phenol and the setting of the pH to from 11.3 to 11.6 take place prior to addition of the catalyst.

In another preferred embodiment of the process according to the invention, p-tert-butylphenol is used as chain terminator. It is preferable that the p-tert-butylphenol is used in step (d) in the form of a solution comprising at least one organic solvent and the p-tert-butylphenol in a concentration of from 2 to 25% by weight, preferably from 3 to 15% by weight. In this embodiment, it is preferable that at the end of the reaction (i.e. in step (d)) the aqueous phase is set to a pH of from 11.5 to 11.8. It is preferable that the addition of the p-tert-butylphenol and the setting of the pH to from 11.5 to 11.5 take place prior to addition of the catalyst.

In the same way, one or more branching agents or mixtures of branching agents can optionally be added to the synthesis. Usually, however, such branching agents are added before the chain terminator(s). For example, trisphenols, quarterphenols, acid chlorides of tri- or tetracarboxylic acids or mixtures of the polyphenols or of the acid chlorides are used as branching agents.

Examples of compounds suitable as branching agents and having three or more than three phenolic hydroxyl groups are phloroglucinol, 4,6-dimethyl-2,4,6-tri(4-hydroxyphenyl)-hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)-cyclohexyl]propane, 2,4-bis(4-hydroxyphenylisopropyl)phenol, tetra(4-hydroxyphenyl)methane.

Examples of other trifunctional compounds suitable as branching agents are 2,4-dihydroxybenzoic acid, trimesic acid, cyanuric chloride and 3,3-bis-(3-methyl-4-hydroxyphenyl)-2-oxo-2,3-dihydroindole. Particularly preferred branching agents are 3,3-bis(3-methyl-4-hydroxyphenyl)-2-oxo-2,3-dihydroindole and 1,1,1-tri(4-hydroxyphenyl)ethane.

The average molecular weights stated in the context of this application are weight averages ($M_w$) which are determined by gel permeation chromatography (GPC, Waters mixed bed columns) in methylene chloride as the eluent (using BPA homopolycarbonate standard with an Mw of f31 000 g/mol).

The synthesis of polycarbonates from dihydroxydiarylalkanes and phosgene in an alkali medium is an exothermic reaction and is preferably carried out according to the invention in a temperature range of −5° C. to 100° C., particularly preferably of 15° C. to 80° C., very particularly preferably of 25° C. to 65° C., superatmosperic pressure sometimes having to be used, depending on solvent or solvent mixture. According to the invention, the temperature on addition of the catalyst in step (d) is at most 45° C. Operations can be carried out at various pressures, depending on the reactor used. By way of example, operations can preferably be carried out at a pressure of from 0.5 to 20 bar (absolute).

The polycarbonate synthesis is carried out continuously. The total reaction, i.e. conversion and further condensation, can therefore be affected in stirred tanks, tubular reactors, pumped-circulation reactors or stirred tank cascades or combinations thereof, the use of the abovementioned mixing members ensuring that aqueous and organic phase as far as possible separate only when the synthesis mixture has completely reacted, i.e. no hydrolysable chlorine of phosgene or chlorocarbonic esters is present. In a preferred embodiment of the process according to the invention, step (b) is carried out in a flow tube. In such an arrangement, an extremely short residence time of less than 0.5 s of the mixing carried out can be particularly advantageously realized. In a further preferred embodiment of the process according to the invention, step (c) is carried out in a pumped-circulation reactor.

It is preferable to use, as pumped-circulation reactor, a tank reactor with pumped-circulation loop and a pumped-circulation rate of from 5 to 15 times, preferably from 7.5 to 10 times, the through-flow quality. The residence time of the reaction mixture in this reactor is preferably from 2 to 20 minutes, particularly preferably from 2 to 5 minutes.

In a further preferred embodiment of the process according to the invention, step (d) is carried out in a pumped-circulation reactor followed by further dwell reactors. Preferably, the residence time of the reaction mixture in the pumped-circulation reactor and the dwell reactors is in each case from 2 to 20 minutes.

The two phases which form the reaction mixture, i.e. organic and aqueous phase, are mixed according to the invention by means of a disperser. Suitable dispersers are preferably nozzles or jet dispersers, in particular those which permit a preferred direction of metering. In the context of the invention, suitable dispersers are known to the person skilled in the art and are described, for example, in EP-A-1 368 407 and EP-A 1 599 520.

Suitable nozzles are, for example, fan spray nozzles, annular slot nozzles, orifice nozzles, Lefos nozzles or smooth-jet nozzles.

Nozzles suitable according to the invention may be those having a specific energy input of, preferably, $0.02 \cdot e^5$ to $5.0 \cdot e^6$ W/L (watts/liter), particularly preferably $0.5 \cdot e^5$ to $1 \cdot e^6$ W/l. Apparatuses of this type are known as jet dispersers, aperture plate dispersers or high-pressure homogenizers.

The pressure to be applied can preferably be 0.001 to 1 MPa, particularly preferably 0.001 to 0.5 MPa.

However, it is also possible to operate dispersers with a substantially lower applied pressure. This is achieved by using a plurality of bores and/or the bores having larger diameters so that the total area of all bores is increased. The required number and the diameter of the bores can be calculated via the pressure drop. Such methods of calculation are described in the literature and are known to the person skilled in the art.

In preferred embodiments of the process according to the invention, dispersers used are those in which the organic and aqueous phase are fed to a predisperser preferably separately to a predisperser by one pump in each case. The pressure of these pumps is in each case preferably not more than 2.5 MPa, preferably from 0.001 to 0.5 MPa.

Homogenization of the predispersion is subsequently effected, preferably in a homogenizing nozzle, likewise at a pressure of not more than 2.5 MPa, preferably from 0.001 to 0.5 MPa. In preferred embodiments of the process according to the invention, the disperser accordingly contains a predisperser and a homogenizing nozzle.

Any desired nozzles, such as, for example, fan spray nozzles, annular slot nozzles, aperture nozzles, Lefos nozzles or smooth-jet nozzles, and jet dispersers are suitable as predispersers. Any desired nozzles, such as, for example, fan spray nozzles, annular slot nozzles, aperture nozzles, Lefos nozzles or smooth-jet nozzles, and jet dispersers are likewise suitable as homogenizing nozzles.

In a further preferred embodiment rotary dispersers as described in EP B1 2090605 may be used.

In spite of the small phosgene excess, the process according to the reaction permits good phase separation at the end of the reaction and both a low water content in the organic phase and also low residual monomer content in the aqueous phase. In addition, the incorporation of catalyst constituents into the product is avoided.

For working up, the reacted, at least two-phase reaction mixture still containing at most traces, preferably less than 2 ppm, of chlorocarbonic acid esters, is allowed to settle for phase separation. The aqueous alkaline phase is optionally recycled wholly or partly to the polycarbonate synthesis as an aqueous phase or fed to the waste water working up where solvent and catalyst fractions are separated off and optionally recycled to the polycarbonate synthesis. In another variant of the working up, after the organic impurities have been separated off, in particular solvents and polymer residues, and optionally after a certain pH has been established, for example by addition of sodium hydroxide solution, the salt is separated off and can be fed, for example, to the chloralkali electrolysis, while the aqueous phase is optionally fed back to the polycarbonate synthesis.

The organic phase containing the polycarbonate can then be purified in various ways known to the person skilled in the art for removing the alkaline, ionic or catalytic contaminations.

Even after one or more settling processes, optionally supported by passages through settling tanks, stirred tanks, coalescers or separators and combinations of these measures—it optionally being possible to meter in water in each separation step or some separation steps, in certain circumstances with the use of active or passive mixing members—the organic phase still contains proportions of the aqueous alkaline phase in fine droplets and of the catalyst(s). After this coarse separation of the alkaline, aqueous phase, the organic phase can be washed once or several times with dilute acids, mineral acids, carboxylic acids, hydroxycarboxylic acids and/or sulphonic acids. Aqueous mineral acids, in particular hydrochloric acid, phosphorus acid, phosphoric acid or mixtures of these acids are preferred. The concentration of these acids should preferably be in the range of 0.001 to 50% by weight, preferably 0.01 to 5% by weight. Furthermore the organic phase can be repeatedly washed with desalinated or distilled water. The separation of the organic phase, optionally dispersed with parts of the organic phase, after the individual wash steps is effected by means of settling tanks, stirred tanks, coalescers or separators or combinations of these measures, it being possible to meter in the wash water between the wash steps, optionally with the use of active or passive mixing members. Between these wash steps or after the washing, acids, preferably dissolved in the solvent on which the polymer solution is based, can optionally be added. Hydrogen chloride gas, phosphoric acid or phosphorus acid, which can optionally also be used as mixtures, are preferably used here. The purified polycarbonate solution thus obtained should preferably contain not more than 5% by weight, preferably less than 1% by weight, very particularly preferably less than 0.5% by weight, of water after the last separation process.

The isolation of the polycarbonate from the solution cart be effected by evaporation of the solvent by means of temperature, vacuum or a heated entraining gas. Other isolation methods are, for example, crystallization and precipitation.

If the concentration of the polycarbonate solution and possibly also the isolation of the polycarbonate are effected by distilling off the solvent, optionally by superheating and expansion, the term "flash process" is used. Such a process is known to the person skilled in the art and is described, for example, in "Thermische Trennverfahren [Thermal separation processes]", VCH Verlagsanstalt 1988, page 114. If instead a heated carrier gas is sprayed together with the solution to be evaporated down, the term "spray evaporation/spray drying" is used, which is described by way of example in Vauck, "Grundoperationen chemischer Verfahrenstechnik [Basic operations of chemical process engineering]", Deutscher Verlag für Grundstoffindustrie 2000, 11th edition, page 690. All these processes are described in the patent literature and in textbooks and are familiar to the person skilled in the art.

On removal of the solvent by temperature (distilling off) or the technically more effective flash process, highly concentrated polycarbonate melts are obtained. In the flash process, polymer solutions are repeatedly heated under slightly superatmospheric pressure to temperatures above the boiling point under atmospheric pressure and these solutions superheated relative to atmospheric pressure are then let down into a vessel at low pressure, e.g. atmospheric pressure, it may be advantageous to ensure that the concentration stages, or in other words the temperature stages of the superheating, are not chosen to be too large but preferably to choose a two- to four-stage process.

The residues of the solvent can be removed from the highly concentrated polycarbonate melts thus obtained either directly from the melt by means of vented extruders (cf. for example BE-A 866 991, EP-A 0 411 510, U.S. Pat. No. 4,980,105, DE-A 33 32 065), thin-film evaporators (cf. for example EP-A 0 267 025), falling-film evaporators, strand evaporators, from evaporators (for example US 2012/015763 A1) or friction compacting (cf. for example EP-A 0 460 450), optionally also with addition of an entraining agent, such as nitrogen or carbon dioxide, or with the use of a vacuum (cf. for example EP-A 0 039 96, EP-A 0 256 003, U.S. Pat. No. 4,423,207), alternatively also by subsequent crystallization (cf. for example DE-A 34 29 960) and/or expulsion of the residues of the solvent by heating in the solid phase (cf. for example U.S. Pat. No. 3,986,269, DE-A 20 53 876). These processes too and the apparatuses required for this purpose are described in the literature and are familiar to the person skilled in the art.

Polycarbonate granules can—if possible—be obtained by direct spinning of the melt and subsequent granulation or by use of discharge extruders from which spinning is effected in air or under liquid, generally water. If extruders are used, additives can be added to the polycarbonate melt before the extruder, optionally with use of static mixers or by side extruders in this extruder.

Alternatively, the polycarbonate solution can be subjected to a spray evaporation. During spraying, the polycarbonate solution, optionally after heating, is either sprayed into a vessel at reduced pressure or sprayed by means of a nozzle with a heated carrier gas, e.g. nitrogen, argon or steam, into a vessel at atmospheric pressure. In both cases, powders (dilute) or flakes (concentrated) of the polymer are obtained, depending on the concentration of the polymer solution, from which the last residues of the solvent optionally also have to be removed as above. Thereafter, granules can be obtained by means of a compounding extruder and subsequent spinning. Here too, additives as described above can be added in the periphery or to the extruder itself. Often, it may be necessary to pass through a compacting step for the polymer powder before the extrusion owing to the low bulk density of the powders and flakes.

The polymer can be substantially precipitated from the washed and optionally still concentrated polycarbonate solution by addition of a nonsolvent for polycarbonate. The nonsolvents act as precipitating agents. Here, it is advantageous first to add a small amount of the nonsolvent and optionally also to allow waiting times between the additions of the batches of nonsolvent. It may also be advantageous to use different nonsolvents. For example aliphatic or cycloaliphatic hydrocarbons, in particular heptane, isooctane or cyclohexane, alcohols, such as, for example, methanol, ethanol or isopropanol, ketones, such as, for example, acetone, or mixtures of these acids are used as precipitating agents here. During the precipitation, as a rule the polymer solution is slowly added to the precipitating agent. The polycarbonates thus obtained are processed to granules as described in the case of the spray evaporation and additives are optionally introduced.

According to other processes, precipitation and crystallization products or amorphously solidified products are crystallized in fine-particle form by passing over vapours of one or more nonsolvents for polycarbonate, with simultaneous heating below the glass transition temperature, and are further condensed to give higher molecular weights. If the oligomers optionally have different terminal groups (phenolic and chain terminator ends), the term solid-phase condensation is used.

The addition of additives serves for increasing the duration of use or improving the colour stability (stabilizers), simplifying the processing (e.g. demoulding agents, flow improvers, antistatic agents) or adapting the polymer properties to certain loads (impact modifiers, such as rubbers; flameproofing agents, colorants, glass fibres).

These additives can be added to the polymer melt individually or together in any desired mixtures or in a plurality of different mixtures. This can be effected directly during the isolation of the polymer or after melting of granules in a so-called compounding step. The additives or the mixtures thereof can be added as a solid, preferably as powder, or as melt to the polymer melt. Another method of metering is the use of masterbatches or mixtures of masterbatches of the additives or additive mixtures.

Suitable additives are described, for example, in "Additives for Plastics Handbook, John Murphy, Elsevier, Oxford 1999", and in "Plastics Additives Handbook, Hans Zweifel, Hanser, Munich 2001".

Examples of suitable antioxidants or heat stabilizers are: alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, acylaminophenols, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, suitable thiosynergistic agents, secondary antioxidants, phosphites, phosphonites, phosphonates and phosphanes, benzofuranones and indolinones.

Preferred antioxidants or heat stabilizers are organic phosphites, phosphonates and phosphanes, generally those in which the organic radicals completely or partially comprise optionally substituted aromatic radicals.

Suitable complexing agents for heavy metals and for neutralization of traces of alkali are, for example, o- or m-phosphoric acids, completely or partly esterified phosphates or phosphites.

Suitable light stabilizers (UV absorbers) are, for example, 2-(2'-hydroxyphenyl)benzotriazoles, 2-hydroxybenzophenones, esters of substituted and unsubstituted benzoic acids, acrylates, sterically hindered amines, oxamides, 2-(2-hydroxyphenyl)-1,3,5-triazines or substituted benzotriazoles; substituted benzotriazoles are particularly preferred.

Polypropylene glycols alone or in combination with, for example, sulphones or sulphonamides as stabilizers can be used to prevent damage by gamma-rays.

These and other stabilizers can be used individually or in combinations and are added in said forms to the polymer.

In addition, processing auxiliaries, such as demoulding agents, such as, for example, derivatives of long-chain fatty acids, may be added. For example, pentaerythrityl tetrastearate and glyceryl monostearate are preferred. They are used alone or as a mixture, preferably in an amount of 0.02 to 1% by weight, based on the mass of the composition. Suitable flame-retardant additives are phosphate esters, i.e. triphenyl phosphate, resorcinol diphosphoric acid esters, bromine-containing compounds, such as brominated phosphoric acid esters, brominated oligocarbonates and polycarbonates, and preferably salts of fluorinated organic sulphonic acids. Suitable impact modifiers are butadiene rubber with grafted-on styrene-acrylonitrile or methyl methacrylate, ethylene-propylene rubbers with grafted-on maleic anhydride, ethyl acrylate and butyl acrylate rubbers with grafted-on methyl methacrylate or styrene-acrylonitrile, interpenetrating siloxane and acrylate networks with grafted-on methyl methacrylate or styrene-acrylonitrile.

Furthermore, colorants, such as organic dyes or pigments and inorganic pigments, IR absorbers, may be added, individually, as a mixture or in combination with stabilizers, glass fibres, (hollow) glass spheres or inorganic fillers.

Polycarbonate melts which were produced by isolation of the polymer or by compounding can be spun in strand form through a die head and cooled with gas, e.g. air or nitrogen, or a cooling liquid, generally water, and the solidified strands can be granulated in commercially available granulators with cutters which are present, for example, on a rotating roll, in air, under inert gas, such as nitrogen or argon, or under water. Depending on the design of the apparatus column-like granules having a round or elliptical cross section and rough or smooth surface form are formed. The cut edges may be smooth or have a glass-like fracture with broken cut edges or remaining residues on the cut edges. Granules which are formed as uniformly as possible and have as few remaining projections as possible on the cut edges are desirable. Furthermore, the dust fraction in the granules should be kept as low as possible, preferably below 100 mg/kg of granules. The diameter of the granule particles should be between 0.5 mm and 10 mm, preferably 1 to 8 mm, particularly preferably 3 to 6 mm. While the length of the granule particles should be between 1 and 10 mm, preferably between 2 and 8 mm, and the weight between 10 and 50 mg, preferably between 15 and 30 mg. Granules whose ratio of diameter, of the average diameter in the case of an elliptical cross section, to length is 0.8 to 1.2 are preferred, and granules having a ratio of about 1 are particularly preferred. These parameters are subject to size distributions, distributions as narrow as possible are preferred, i.e. granules having dimensions as uniform as possible.

Cooling, spinning, granulation and the subsequent transport or the conveying of the granules with gas or liquid and the subsequent storage, optionally after a mixing or homogenization process, should be designed so that, in spite of any static charge build-up present, as far as possible no impurities are applied to the polymer surface, strand surface or granule surface, such as, for example, dust, abrasion material from the machines, aerosol-like lubricants and other liquids and salts from water baths or cooling systems possibly used.

The polycarbonates prepared according to the invention are suitable, for example, for the production of extrudates and mouldings, in particular those for use in the transparent area, very particularly in the area of optical applications, such as, for example, sheets, multi-wall sheets, glazings, diffuser screens, lamp coverings or optical data stores, such as audio CD, CD-R(W), DVD, DVD-R(W), minidiscs in their various read-only or recordable and optionally also rewritable embodiments.

Examples of further applications, but without limiting the subject of the present invention, are:
1. Safety screens, which are known to be required in many areas of buildings, vehicles and aircraft, and as visors of helmets.
2. Sheets.
3. Blow-moulded bodies (also see U.S. Pat. No. 2,964, 794), for example 1 to 5 gallon water bottles.
4. Transparent sheets, such as solid sheets, in particular hollow-chamber sheets, for example for covering buildings, such as railway stations, greenhouses and lighting systems.
5. Optical data stores, such as audio CDs, CD-R(W)s, DCDs, DVD-R(W)s, minidiscs and the subsequent developments.
6. Traffic light housings or traffic signs.
7. Foams having an open or closed optionally printable surface.
8. Filaments and wires (see also DE-A 11 37 167).
9. Lighting applications, optionally with the use of glass fibres for applications in the translucent area.
10. Translucent formulations containing barium sulphate and/or titanium dioxide and/or zirconium oxide or organic polymeric acrylate rubbers (EP-A 0 634 445, EP-A 0 269 324) for the production of transparent and light-scattering shaped articles.
11. Precision injection-moulded parts, such as holders, e.g. lens holders; polycarbonates comprising glass fibres and an optionally additional content of 1-10% by weight of molybdenum disulphide (based on the total moulding area) are optionally used here.
12. Optical instrument parts, in particular lenses for photographic cameras and cine cameras (DE-A 27 01 173).
13. Light transmission media, in particular optical fibres (EP-A 0 089 801) and lighting strips.
14. Electrical insulation materials for electrical conductors and for plug housings and connectors and capacitors.
15. Mobile telephone housings.
16. Network interface devices.
17. Carrier materials for organic photoconductors.
18. Lights, headlight lamps, light diffuser screens or inner lenses.
19. Medical applications, such as oxygenators or dialysers.
20. Food applications, such as bottles, crockery and chocolate moulds.
21. Applications in the automotive sector, such as glazings or in the form of blends with ABS as bumpers.
22. Sports articles, such as slalom poles or ski boot fasteners.
23. Household articles, such as kitchen sinks, wash basins, letterboxes.
24. Housings, such as electrical distributor boxes.
25. Housings for electrical devices, such as toothbrushes, hair-dryers, coffee machines, machine tools, such as drills, cutters, planes and saws.
26. Washing machine port holes.
27. Safety goggles, sunglasses, corrective glasses or lenses thereof.
28. Lamp coverings.
29. Packaging films.
30. Chip boxes, chip supports, boxes for Si wafers.
31. Other applications, such as animal shed doors or animal cages.

The following examples serve for the exemplary explanation of the invention and are not to be considered as limiting.

EXAMPLES

The dihydroxydiarylalkane used is 2,2'-bis(4-hydroxyphenyl)propane (Bisphenol A, BPA) and the solvent of the organic phase is a mixture of 50 to 60% by weight of methylene chloride and 50 to 40% by weight of monochlorebenzene. In all examples a polycarbonate was produced with a weight-average molecular weight of from 25 000 to 26 000 g/mol, measured by GPC (Waters "mixed bed" columns in methylene chloride with BPA homopolycarbonate standard with Mw of 31 000 g/mol).

Examples 1 to 3 were carried out in a pilot plant.

Example 1 (According to the Invention)

The following were used as apparatuses for the individual process steps:

Process step (a): Disperser in the form of an aperture plate nozzle with predispersing (having an aperture plate with 5 bores of 2.5 mm diameter each with a perforated plate thickness of 2.35 and a pressure drop of 0.2 bar at 5.2 m/s flow velocity), 26 ms residence time in the predispersing space and subsequent dispersing (with a further aperture plate having 18 bores of 1.5 mm diameter each with a perforated plate thickness of 2.35 mm and 0.8 bar pressure drop at a flow velocity of 8.9 m/s) by which one liquid is dispersed in the other.

Process step (b): A dwell time reactor with 0.2 s residence time.

Process step (c): A pump-circulation reactor equipped with one feeding point (for example for NaOH), a pump, a heat exchanger, an overflow container and a T-shaped sampling point having a volume of 140 l, equipped with a pH probe and a conductivity probe; redispersing is effected on entry into the pump-circulation reactor Process step (d): A discharge pump with upstream metering points for chain terminator and NaOH solution, a static mixer inbetween, downstream a coiled-tube reactor having mixing and dwell zones and a total volume of 60 l (first dweller reactor), and downstream a further coil-tube reactor (second dwell reactor), with a metering point for catalyst at the beginning of the reactor and a total volume of 80 l.

Subsequent Phase separation: Separation vessel (size 4.15 m$^3$ at a level of 50%).

The following streams were used in process step (a):
  600 kg/h of aqueous BPA solution (15% by weight of BPA, based on the total weight of the solution, 2.13 mol of NaOH/mol of BPA)
  44.6 kg/h of phosgene
  520 kg/h of solvent mixture comprising 54% by weight of me ene chloride and 46% by weight of chlorobenzene
  No further streams were additionally used in process step (b) and (c).

The following streams were additionally used in process step (d) on the first dwell reactor:
  17.8 kg/h of tert-butylphenol solution (20% by weight, in solvent mixture comprising 54% by weight of methylene chloride and 46% by weight of chlorohenzene)

35 kg/h of aqueous NaOH solution with 32% by weight of NaOH

The following stream was additionally used in process step (d) in the second dwell reactor:

22.7 kg/h of catalyst solution (3% strength by weight solution, ethylpiperidine in solvent mixture comprising 54% by weight of methylene chloride and 46% by weight of chlorobenzene.

The temperature in the pumped-circulation reactor was between 35° C. (after the heat exchanger) and 38° C. (before the heat exchanger). The temperature in the coiled-tube reactors in process step (d) was in each case 37° C. and that in the separation vessel was 35° C.

The dispersing direction was set so that the organic phase was dispered in the aqueous phase.

A phosgene excess of 8.7 mol % was employed. After the phase separation, the following values were determined (in each case the mean value of 3 repeat experiments):

| | |
|---|---|
| BPA in water | 1 ppm |
| Water content in the organic phase after settling | 0.98% by weight |
| Nitrogen incorporated in the product | <2 ppm |

The low water content in the organic phase and the low residual monomer content BPA in the waste water showed outstanding quality of the phase separation. In addition, the dispersion showed good and stable separation behaviour. No significant side reactions were detected (no nitrogen incorporated).

Example 2 (Comparative Example)

The apparatus employed was as under Example 1, except that the reaction temperature was increased.

The following streams were used in process step (a):
600 kg/h of aqueous BPA solution (15% by weight of BPA, based on the total weight of the solution, 2.13 mol of NaOH/mol of BPA)
44.6 kg/h of phosgene
500 kg/h of solvent mixture comprising 54% by weight of methylene chloride and 46% by weight of chlorobenzene No further streams were additionally used in process step (b) and (c).

The following streams were additionally used in process step (d) on the first dwell reactor:
17.8 kg/h of tert-butylphenol solution (20% by weight, in solvent mixture comprising 54% by weight of methylene chloride and 46% by weight of chlorobenzene)
33 kg/h of aqueous NaOH solution with 32% by weight of NaOH The following stream was additionally used in process step (d) on the second dwell reactor:
23 kg/h of catalyst solution (3% strength by weight solution, ethylpiperidine in solvent mixture comprising 54% by weight of methylene chloride and 46% by weight of chlorobenzene The temperature in the pump-circulation reactor was between 55° C. (after the heat exchanger) and 575° C. (before the heat exchanger). The temperature in both coiled-tube reactors in process step (d) was in each case 55° C. and that in the separation vessel was 35° C.

A phosgene excess of 8.9 mol % was employed. After the phase separation, the following values were determined (in each case the mean value of 3 repeat experiments):

| | |
|---|---|
| BPA in the waste water | 16 ppm |
| Water content in the organic phase after settling | 2.2% by weight |
| Nitrogen incorporated in the product | 27 ppm |

In spite of the higher residual monomer content of BPA in the waste water and overall the reaction behaviour (deviations between the repeat tests were greater), high-quality phase separation was observed, with a water content in the organic phase which was still very low. In addition, the dispersion showed good and stable separation behaviour. However, the proportion of side reactions was markedly greater, as could be seen from the presence of up to 30 ppm of nitrogen incorporated into the polymer chain.

The following streams were used in process step (a):
600 kg/h of aqueous BPA solution (14.88% by weight of BPA, based on the total weight of the solution, 2.14 mol of NaOH/mol of BPA)
44 kg/h of phosgene
500 kg/h of solvent mixture comprising 52% by weight of methylene chloride and 48% by weight of chlorobenzene No further streams were additionally used in process step (b) and (c).

The following streams were additionally used in process step (d) on the first dwell reactor:
17.6 kg/h of tert-butylphenol solution (20% by weight, in solvent mixture comprising 52% by weight of methylene chloride and 48% by weight of chlorobenzene)
33 kg/h of aqueous NaOH solution with 32% by weight of NaOH The following stream was additionally used in process step (d) on the second dwell reactor:
24 kg/h of catalyst solution (3% strength by weight solution of ethylpiperidine in solvent mixture comprising 52% by weight of methylene chloride and 48% by weight of chlorobenzene)

The temperature in the pumped-circulation reactor was between 55° C. (after the heat exchanger) and 58° C. (before the heat exchanger). The temperature in the first coiled-tube reactor in process step (d) was 55° C., that in the second coiled-tube reactor in process step (d) was 36° C. and that in the separation vessel was 35° C.

A phosgene excess 9.1 mol % was employed. After the phase separation, the following values were determined (in each case the mean value of 3 repeat experiments):

| | |
|---|---|
| BPA in the waste water | 4 ppm |
| Water content in the organic phase after settling | 1.7% by weight |
| Nitrogen incorporated in the product | <2 ppm |

Both the residual monomer content of BPA in the waste water and the water content in the organic phase were similar to example 1. In the phase separation, no instabilities in the separation were observed. No significant side reactions were detected (no nitrogen incorporated).

Examples 4-8

For monitoring the effect of the dispersing and the course of the phosgenation according to the temperature conditions and pH conditions, and location of the addition points, described previously, further experiments were carried out in a number of pilot plants with appropriately designed orifice nozzles (designed according to the invention), and the stability of the process and the quality of the product were both observed.

A 15% by weight aqueous BPA solution (based on the total weight of the solution) having a NaOH/BPA molar ratio of 2.14 was used as the aqueous phase for Examples 4-7. A mixture comprising 50% by weight of methylene chloride and 50% by weight of chlorobenzene was used as a solvent for the organic phase, to which various amounts of phosgene were added. The reactants were dispersed in the nozzle described above, the direction of dispersing and hence the preadjustment of the dispersion was oil-in-water. The pressure drop over the nozzle was about 1.2 bar during the experiments. Reaction temperature and pH were set to the range preferred according to the invention by means of a cooler in the pumped-circulation loop of the step (c); (temperature in step (c) 36° C., at the end of the step (d) it had risen to 42° C.); and with the aid of appropriate metered addition of NaOH (setting a pH of about 11.5). For purposes of comparability of the experiments in pilot plants of different sizes, the metered quantities per 10 000 kg of bisphenol solution are stated.

Operations in the pilot plant used the following solutions:
aqueous biphenolate solution (15% by weight of BPA, based on total weight of the solution, 2.14 mol of sodium hydroxide solution/mol of BPA);
32% by weight of aqueous NaOH solution;
25% by weight of phenol solution in solvent mixture made of 50% by weight of methylene chloride and 50% by weight of chlorobenzene as chain terminator,
or 20% by weight of tert-butylphenol solution in solvent mixture made of 50% by weight of methylene chloride and 50% by weight of chlorobenzene as alternative chain terminator; and
as catalyst solution: 7.5% by weight of ethylpiperidine in solvent mixture made of 50% by weight of methylene chloride and 50% by weight of chlorobenzene.

Example 4 (According to the Invention)

The streams metered into the system in Example 4 per 10 000 kg of bisphenol solution were as follows:
The following streams were used in the process step (a) (concentrations as described above):
10 000 kg of BPA solution (measured content of BPA 15.15% by weight)
8100 kg of solvent mixture
745 kg of phosgene
In process step (b) and (c) no further additional streams were used, and the residence time in step (b) was from 0.1 to 0.2 second.
In process step (d) the following additional streams were used at the first dwell reactor:
218 kg of tert-butylphenol solution
335 kg of aqueous NaOH solution (32% by weight)
In process step (d) the following additional stream was used at the second dwell reactor
197 kg of ethylpiperidine solution.
Operations were carried out with a phosgene excess of 11.1 mol %. After the phase separation the following values were determined:

| | |
|---|---|
| BPA in the waste water | 15 ppm |
| Water content in the organic phase after settling | 1.9% by weight |
| Nitrogen incorporated in the product | <2 ppm |

Example 5 with High Phosgene Excess and Phenol as Chain Terminator (Comparative Example)

The streams metered into the system in Example 5 per 10 000 kg of bisphenol solution were as follows:
The following streams were used in the process step (a) (concentrations as described above):
10 000 kg of BPA solution (measured content of BPA 15.00% by weight)
8500 kg of solvent mixture
768 kg of phosgene
In process step (b) no further additional streams were used, and the residence time in step (b) was from 0.1 to 0.2 second.
In process step (c) the following additional stream was used:
114 kg of aqueous NaOH solution (32% by weight)
In process step (d) the following additional streams were used at the first dwell reactor:
98 kg of phenol solution
331 kg of aqueous NaOH solution (32% by weight)
In process step (d) the following additional stream was used at the second dwell reactor:
159 kg of ethylpiperidine solution.
Operations were carried out with a phosgene excess of 15.9 mol %. After the phase separation the following values were determined:

| | |
|---|---|
| BPA and phenol in the waste water | 140 ppm |
| Water content in the organic phase after settling | 0.6% by weight |
| Nitrogen incorporated in the product | <2 ppm |

Example 6 (According to the Invention)

The streams metered into the system in Example 6 per 10 000 kg of bisphenol solution were as follows:
The following streams were used in the process step (a) (concentrations as described above):
10 000 kg of BPA solution (measured content of BPA 15.05% by weight)
8200 kg of solvent mixture
751 kg of phosgene
In process step (b) and (c) no further additional streams were used, and the residence time in step (b) was from 0.1 to 0.2 second.
In process step (d) the following additional streams were used at the first dwell reactor:
99 kg of phenol solution
369 kg of aqueous NaOH solution (32% by weight)
In process step (d) the following additional stream was used at the second dwell reactor:
208 kg of ethylpiperidine solution.
Operations were carried out with a phosgene excess of 13.0 mol %. After the phase separation the following values were determined:

| | |
|---|---|
| BPA and phenol in the waste water | 140 ppm |
| Water content in the organic phase after settling | 1.7% by weight |
| Nitrogen incorporated in the product | <2 ppm |

Example 7 (According to the Invention)

The streams metered into the system in Example 7 per 10 000 kg of bisphenol solution were as follows:

The following streams were used in the process step (a) (concentrations as described above):
  10 000 kg of BPA solution (measured content of BPA 14.98% by weight)
  8000 kg of solvent mixture
  745 kg of phosgene In process step (b) and (c) no further additional streams were used, and the residence time in step (b) was from 0.1 to 0.2 second.

In process step (d) the following additional streams were used at the first dwell reactor:
  289 kg of tert-butylphenol solution
  335 kg of aqueous NaOH solution (32% by weight)

In process step (d) the following additional stream was used at the second dwell reactor:
  188 kg of ethylpiperidine solution.

Operations were carried out with a phosgene excess of 11.5 mol %. After the phase separation the following values were determined:

| | |
|---|---|
| BPA in the waste water | 30 ppm |
| Water content in the organic phase after settling | 1.6% by weight |
| Nitrogen incorporated in the product | <2 ppm |

Example 8 (Comparative Example)

In Example 8 a disperser according to the invention was incorporated into a second pilot plant, and reaction temperature and pH were set by means of a cooler in the pumped-circulation loop of the step (c); (temperature in step (b) 42° C., at the end of the step (d) it had risen to 54° C.) and appropriate metered addition of NaOH (setting to a pH of about 11.5).

The streams metered into the system in this example per 10 000 kg of bisphenol solution were as follows:

The following streams were used in the process step (a) (concentrations as described above):
  10 000 kg of BPA solution (measured content of BPA 15.4% by weight and 2.10 mol of NaOH per mole of BPA)
  8000 kg of solvent mixture (made of 50% by weight of methylene chloride and 50% by weight of chlorobenzene
  760 kg of phosgene In process step (b) and (c) no further additional streams were used, and the residence time in step (b) was from 0.1 to 0.2 second.

In process step (d) the following additional streams were used at the first dwell reactor:
  57 kg of tert-butylphenol solution (14.29% by weight in solvent mixture made of 50% by weight of methylene chloride and 50% by weight of chlorobenzene)
  409 kg of aqueous NaOH solution (32% by weight of NaOH)

In process step (d) the following additional stream was used at the second dwell reactor:
  243 kg of ethylpiperidine solution (2.5% by weight in solvent mixture made of 50% by weight of methylene chloride and 50% by weight of chlorobenzene).

Operations were carried out with a phosgene excess of 10.8 mol %. After the phase separation the following values were determined:

| | |
|---|---|
| BPA in the waste water | 28 ppm |
| Water content in the organic phase after settling | 2.2% by weight |
| Nitrogen incorporated in the product | 8 ppm |

It is immediately noticeable that although this example proceeds in a very stable manner through the production process, failure to set the temperature according to the invention results in an increased proportion of the side reactions noticeable via increased incorporation of nitrogen within the product.

The invention claimed is:

1. Process for the continuous preparation of polycarbonates with weight-average molecular weights $M_w$ of 15 000-200 000 g/mol by the phase boundary process, the polycarbonates prepared from at least one dihydroxydiarylalkane, phosgene and at least one catalyst, optionally in the presence of at least one chain terminator and/or branching agent, wherein
   (a) providing a mixture of an organic and of an aqueous phase produced by continuously dispersing the organic phase in the aqueous phase or the aqueous phase in the organic phase in a dispenser, the organic phase containing at least one solvent suitable for the polycarbonate and at least some of the phosgene and the aqueous phase containing the at least one dihydroxydiarylalkane, water and from 2.00 to 2.05 mol of alkali solution per mol of the at least one dihydroxydiarylalkane,
   (b) reacting the mixture in a reactor with a residence time of less than 0.5 s,
   (c) redispersing the reaction mixture and allowing further reaction of the mixture, optionally with addition of chain terminator(s) in a pumped-circulation reactor with a recirculation rate of 5 to 15 times the amount of flow, and
   (d) adding more alkali solution to facilitate further condensation, chain terminator(s) and at least one catalyst in at least one further reactor,
   where the reaction temperature in step (d) is at most 45° C., and the aqueous phase is set to a pH between 11.3 and 11.8, and where no alkali solution is added in the steps (b) and (c).

2. Process according to claim 1, wherein in step (d) the pH value is set before addition of the catalyst, and the steps (a) to (c) are carried out in the absence of a catalyst.

3. Process according to claim 1, wherein the reaction temperature in step (d) on catalyst addition is from 35° C. to 45° C.

4. Process according to claim 1, wherein the aqueous phase in step (d) is set to a pH of from 11.3 to 11.6.

5. Process according to claim 1, wherein the residence time of the reaction mixture in the reactor of the step (c) is from 2 to 20 minutes.

6. Process according to claim 1, wherein the residence time of the reaction mixture in the one or more reactors of the step (d) is (respectively) from 2 to 20 minutes.

7. Process according to claim 1, wherein the excess of phosgene used, based on the sum of the dihydroxydiarylalkanes used, is at most 11 mol %.

8. Process according to claim 1, wherein the at least one dihydroxydiarylalkane is selected from 4,4'-dihydroxybiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane or any one mixture thereof.

9. Process according to claim 1, wherein the chain terminator(s) includes phenol.

10. Process according to claim 9, further comprising adding a solution comprising at least one organic solvent and the phenol in a concentration of from 5 to 40% by weight in step (d).

11. Process according to claim 9, further comprising adjusting the aqueous phase at the end of the reaction to a pH of from 11.3 to 11.6.

12. Process according to claim 1, further comprising adding a solution comprising at least one organic solvent and, as chain terminator, p-tert-butylphenol in a concentration of from 2 to 25% by weight in step (d).

13. Process according to claim 12, wherein the aqueous phase is set at the end of the reaction to a pH of from 11.5 to 11.8.

14. A process for the continuous preparation of polycarbonates by the phase boundary process, the polycarbonates prepared from at least one dihydroxydiarylalkane, phosgene, a chain terminator, and at least one catalyst, wherein (a) providing a mixture of an organic and of an aqueous phase produced by continuously dispersing the organic phase in the aqueous phase or the aqueous phase in the organic phase in a dispenser, the organic phase containing at least one solvent suitable for the polycarbonate and at least some of the phosgene and the aqueous phase containing the at least one dihydroxydiarylalkane, water and from 2.00 to 2.05 mol of alkali solution per mol of the at least one dihydroxydiarylalkane, (b) reacting the mixture in a reactor with a residence time of less than 0.5 s, (c) redispersing the reaction mixture and allowing further reaction of the mixture, optionally with addition of chain terminator(s) in a pumped-circulation reactor with a recirculation rate of 5 to 15 times the amount of flow, and the steps (a) to (c) are carried out in the absence of the at least one catalyst, and the residence time of the reaction mixture in the reactor of the step (c) is from 2 to 20 minutes, and (d) adding more alkali solution to facilitate further condensation, the chain terminator, and the at least one catalyst in at least one further reactor, and where the reaction temperature in step (d) is at most 45° C., and the aqueous phase is set to a pH between 11.3 and 11.8, and where no alkali solution is added in the steps (b) and (c), and wherein the amount of excess phosgene used, based on the sum of the dihydroxydiarylalkanes used, does not exceed 11 mol %, the polycarbonates having a weight-average molecular weights $M_w$ of 15 000-200 000 g/mol.

15. The process of claim 14, wherein the chain terminator is selected from phenol, p-tert-butylphenol or a mixture thereof, and the at least one dihydroxydiarylalkane is selected from 4,4'-dihydroxybiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane or any one mixture thereof.

* * * * *